United States Patent [19]

Molnar et al.

[11] 4,272,012
[45] Jun. 9, 1981

[54] METHOD AND SYSTEM FOR CONTROLLING A PLURALITY OF TEMPERATURE CONDITIONING UNITS

[76] Inventors: John R. Molnar, 426 James St.; Earl H. Mechling, Butler Rd.; William L. Bell, 525 Oakwood Ave., all of Springdale, Pa. 15144

[21] Appl. No.: 18,923

[22] Filed: Mar. 9, 1979

[51] Int. Cl.³ .................. H02J 1/00; G05D 23/12
[52] U.S. Cl. ............................ 236/1 E; 62/231;
165/12; 307/39; 236/46 R
[58] Field of Search ............. 62/231, 234; 165/12;
236/46 R, 51, 1 EA, 1 ER; 307/39, 41; 219/486

[56] References Cited

U.S. PATENT DOCUMENTS

| | | | |
|---|---|---|---|
| 2,268,761 | 1/1942 | McGrath | 236/46 |
| 2,276,058 | 3/1942 | Midyette, Jr. | 236/91 |
| 2,958,755 | 11/1960 | Miller . | |
| 3,497,710 | 2/1970 | Gorman et al. | 307/41 |
| 3,979,060 | 9/1976 | Tierce | 165/12 X |
| 4,100,426 | 7/1978 | Baranowski et al. | 307/41 |
| 4,136,393 | 1/1979 | Fox | 307/41 X |
| 4,141,407 | 2/1979 | Briscoe et al. | 62/231 X |

*Primary Examiner*—William E. Wayner
*Attorney, Agent, or Firm*—Parmelee, Miller, Welsh & Kratz

[57] ABSTRACT

A plurality of temperature conditioning units are divided into groups with the groups being sequentially and repetitively, one after the other, enabled for a first preset number of timing intervals and then disabled for a second preset number of timing intervals. The sum of the first and second preset number of timing intervals is equal to the total number of groups so that at any given time, but on a rotating basis, the first preset number of groups of units is enabled and the second preset number is disabled. A setback feature which can be overriden by a thermostatic control is provided for off hours. An alarm system provides warning of abnormal operation of any one of the units as detected by excessive cycling.

10 Claims, 4 Drawing Figures

METHOD AND SYSTEM FOR CONTROLLING A PLURALITY OF TEMPERATURE CONDITIONING UNITS

BACKGROUND OF THE INVENTION

1. Field of the Invention

This invention relates to a method and apparatus for controlling a plurality of temperature conditioning units such as a large number of heating and/or air conditioning units arranged to condition the air in a large enclosed area or multiple refrigeration units as may be found in a supermarket or a cold storage plant.

2. Prior Art

It is now common practice to heat and/or air condition large enclosed areas, such as stores, warehouses, factories and offices, with a number of independent conditioning units dispersed through the enclosed area. Each of the units is equipped with its own thermostatic controls for maintaining selected conditions in the area served by that unit. Typically, the controls include a "setback" feature wherein the temperature to be maintained is lowered (or raised if cooling is required) during hours when the space is not occupied in order to conserve energy. An example of such a setback control system is disclosed in U.S. Pat. No. 2,276,058, Attempts have been made to control the multiple conditioner units in large enclosed areas with a central digital computer control in order to reduce the cost of operation, however, they have typically resulted in uncomfortable or erratic conditions for the occupants primarily because parameters such as kilowatt hours of electricity or demand have been used as the primary control parameter.

It is also known to stagger the opening of control valves in a zone temperature control system as suggested by U.S. Pat. No. 2,268,761, in attempt to even demand. However, under that system, although the valves are opened at three minutes intervals, there is no requirement that any valves be turned off when others are turned on and therefore all of the valves may be open at once.

Likewise, U.S. Pat. No. 2,958,755 discloses a control circuit which turns on a number of strip heaters one at a time at spaced intervals to eliminate a sudden demand for electrical energy; however, ultimately all of the heaters are on at the same time. Since, unlike equipment incorporating electric motors, there are no peaks created by turn on of resistance type heaters, there is no reduction in peak power drawn by this system but only a reduction in the rise time of the demand.

Often an installation will utilize a number of refrigeration units. For instance, a typical supermarket will have several frozen food cases, dairy cases, meat cases, vegetable cases, ice cream boxes and meat lockers each having one or more refrigeration units. Typically, these units have compressors, pumps, circulating fans and defrosters which draw substantial amounts of electric power and contribute significantly to the cost of doing business, hence it is important that the equipment be operated as efficiently as possible. A common problem, especially in the units open to ambient air, is the buildup of ice on the evaporator coils. The ice acts as an insulator causing the unit to run continuously in trying to lower the temperature to the set point temperature whether that temperature is controlled by a thermostat or by refrigerant pressure controls as in many commercial installations. This buildup of ice necessitates periodic defrosting of the evaporator coils such as by hot gas or by resistance heating. In many freezer installations, three or four ninety minute defrosting cycles per day are required.

It is a primary object of the present invention to operate a multiple unit temperature conditioning system at increased efficiency while still providing consistent temperature conditions.

It is also an object of the invention to provide such a system with means for signaling conditions which reduce the efficiency of the system.

It is another major objective of the invention to provide such a system which reduces the demand for energy and reduces energy consumption.

SUMMARY OF THE INVENTION

In accordance with the invention, the temperature conditioning units of a multi-unit installation are divided into groups. The groups of conditioners are sequentially enabled one group after the other for a first preset number of time intervals and then disabled for a second preset number of intervals. The sum of the first and second number of time intervals is equal to the number of groups of conditioners such that the first preset number of groups of conditioners are enabled while the second number are disabled at all times on a rotating basis. The individual units are only enabled or disabled by the present system and control over their operation during the enable periods remains in the unit's own temperature or pressure responsive controls.

Apparatus for carrying out the invention includes a clock for generating timing intervals and control means for each group of conditioners which enables the same when energized. The control means are energized in sequence by a sequencer driven by the clock. Conditioner units which may be controlled by the system include refrigeration, heating and air conditioning units and combination units such as heat pumps. Means are provided within each group control to stagger the enabling of individual units within the group to reduce the demand when a group is first enabled following an off interval.

The system also provides means for detecting inefficient operation of the system and impending failure by generating warning signals. A normal condition preceding failure of a compressor in a cooling unit or following failure of a fan belt in a heating system is cycling of the unit. The invention detects these conditions by counting the number of times the unit cycles in a given interval and generates a visual, audible and/or remote warning signal if the cycling exceeds a predetermined rate.

Where the conditioner units are heating and/or air conditioning units for large enclosed areas, individual units from the various groups of units are interspersed throughout the enclosed area. With this arrangement, the areas served by the disabled units receive conditioned air from adjacent operating units. This is effective since invariably, individual units with excess capacity are provided in such installations and local variations of a few degrees are not noticeable or objectionable. By periodically rotating the groups of units which are enabled or disabled, substantially uniform conditions are maintained.

It is preferred that the units be divided into three groups with two groups enabled and one group disabled at any one time. A suitable time interval has been found to be ten minutes, such that the units of each group will be enabled for twenty minutes and disabled for ten minutes. This ten minute off period has been found to be very satisfactory for refrigeration systems in that it reduces frosting of the evaporator coils and in some instances eliminates completely the need for heat generating defrosters.

The system also includes a setback feature controlled by a program clock which disables all the groups of conditioner units when the conditioned area is unoccupied such as at night and on weekends. A thermostatic control is also provided, however, to override the setback feature should the temperature fall below a preset minimum level in the case of heating or exceed a preset maximum level in the case of cooling. Thus, in either case, the system will prevent the temperature from deviating from a preset temperature range even during off hours.

DESCRIPTION OF THE PREFERRED EMBODIMENT

Figure 1:
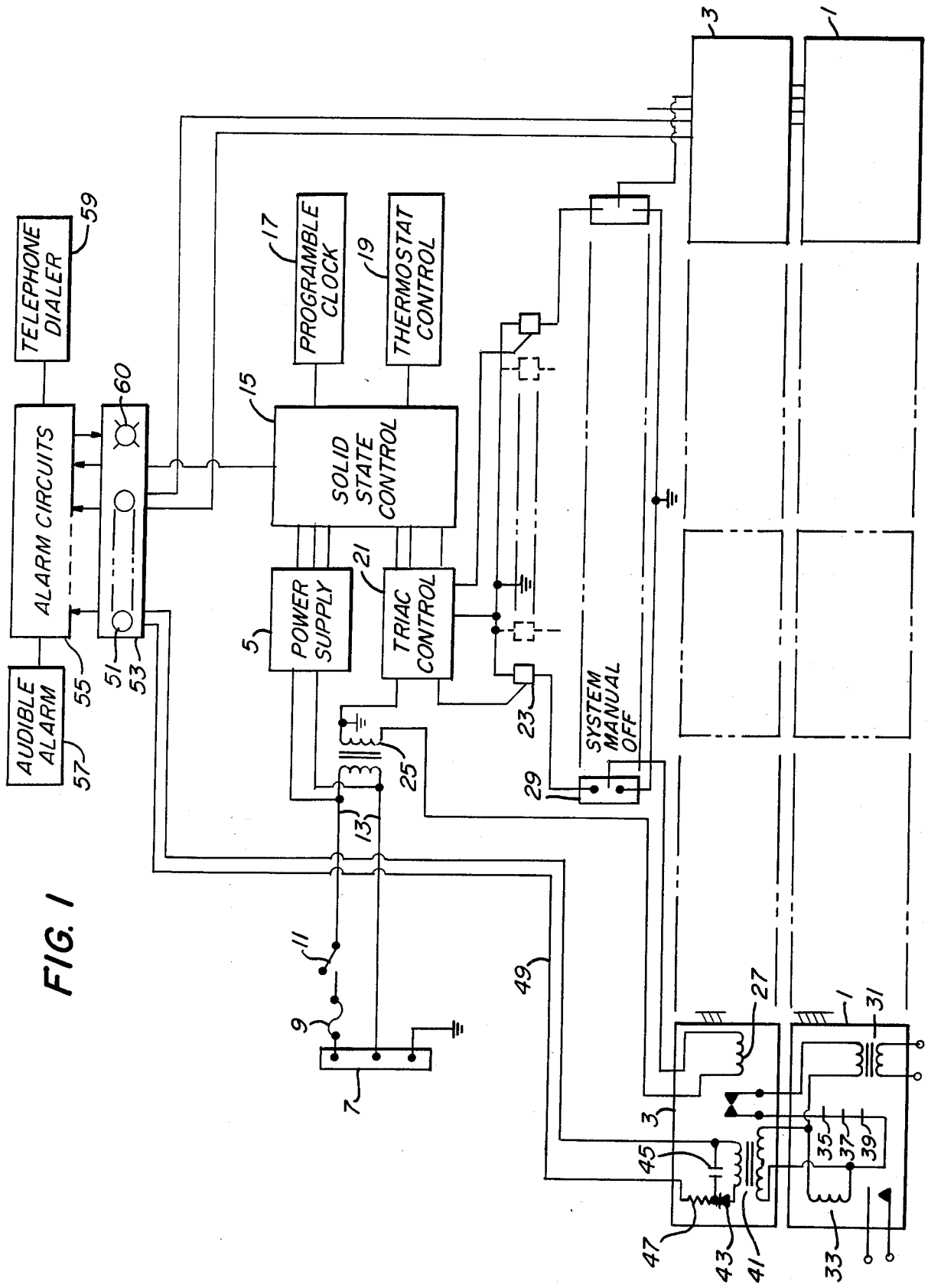
FIG. 1 is a schematic circuit diagram of a control system in accordance with the invention.

The invention will be described as applied to an installation comprising nine air conditioning units or nine refrigeration units, but it is to be understood that the invention is adaptable to an installation comprising any number of units and also to installations including heating units or combination heating and cooling units. As seen in FIG. 1, the system is interconnected with the control box 1 associated with each of the cooling units through a remote control unit 3. Identical units 3 are provided for each of the cooling units although only one unit is shown in detail in FIG. 1 for clarity.

The system includes a power supply 5 which is energized by 110 volt 60 hertz line current applied to terminal strip 7 and supplied to power supply 5 through fuse 9, off-on switch 11 and lines 13. The power supply 5 generates +8 and +12 volt DC current for energizing other components in the system and supplies a 60 hertz pulse signal to solid state control 15 which will be described in detail below. The solid state control 15, which under certain conditions may be influenced by a programmable clock 17 and a thermostatic control 19, supplies signals to the Triac Control 21 which controls the gate electrode of a triac 23 associated with each of the remote control units 3. The triacs 23 in turn gate 24 volt AC power from the secondary of stepdown transformer 25 to the coils of control relays 27 in the remote control units 3 through three position mode switches 29.

In order to understand how the system controls the operation of the individual cooling units, a brief explanation of the operation of a typical control box 1 associated with each unit is in order. Each control box includes a transformer 31 which supplies 110 volt 60 hertz current for energizing the coil of a control relay 33 through contacts 35 of the unit's own thermostatic control and contacts 37 and 39 respectively of the associated compressor high and low pressure switches. When relay 33 is energized, its normally open contacts close to supply power to the unit's compressor which effects the desired level of cooling in a well known manner. When the temperature has been lowered to the desired setting, the thermostat contacts 35 will open to deenergize relay 33 and thereby turn off the compressor. The high and low pressure switches respond to the pressure of refrigerant and are effective to maintain this pressure within predetermined limits.

The control system of this invention interposes the normally closed contacts of relay 27 into the energizing circuit of the control relay 33. Thus, when relay 27 is deenergized, control relay 33 operates in the manner previously described under the unit's own thermostatic and pressure controls. However, when relay 27 is energized, the air conditioning unit associated with the control box 1 can not run no matter what the condition of the local thermostatic or pressure controls is. The relay 27 in remote control unit 3 is energized when the mode switch 29 is in SYSTEM only when the triac 23 is turned on by a signal from the triac control 21 which, it will be recalled, is controlled by solid state control 15. The conditions under which the solid state control 15 asserts control over the triacs and therefore enables or disables the individual cooling units control boxes 1 will be discussed below.

When the mode switch 29 is placed in MANUAL, it is clear from FIG. 1 that relay 27 can not be energized and therefore each air conditioning unit responds solely to its own controls situated in the control box 1. On the other hand, when mode switch 29 is placed in the OFF position, the relay 27 is continuously energized and the compressors of the individual units can not be turned on at all.

Included in the remote control unit 3 is a step down transformer 41 which has its primary connected across the control relay 33 in the control box 1. The secondary of transformer 41 produces a 24 volt AC current which is rectified by diode 43 and filtered by capacitor 45. This signal, which is indicative of the operation of the compressor of the associated air conditioning unit, is brought down to 2.5 volts by dropping resistor 47 which is connected in series by lead 49 with a light emitting diode (LED) 51 on a light panel 53. Alarm circuits 55 connected into the LED circuits activate an audible alarm 57 and/or a telephone dialer 59 and turn on a flashing warning LED 60 on panel 53 under certain conditions to be discussed below. The flashing light and audible alarm alert personnel present of the detected condition. When no one is present, such as at unmanned facilities or at night or on weekends, the alarm circuit can be arranged to activate the telephone dialer which transmits a prerecorded message to appropriate personnel.

Figure 2:
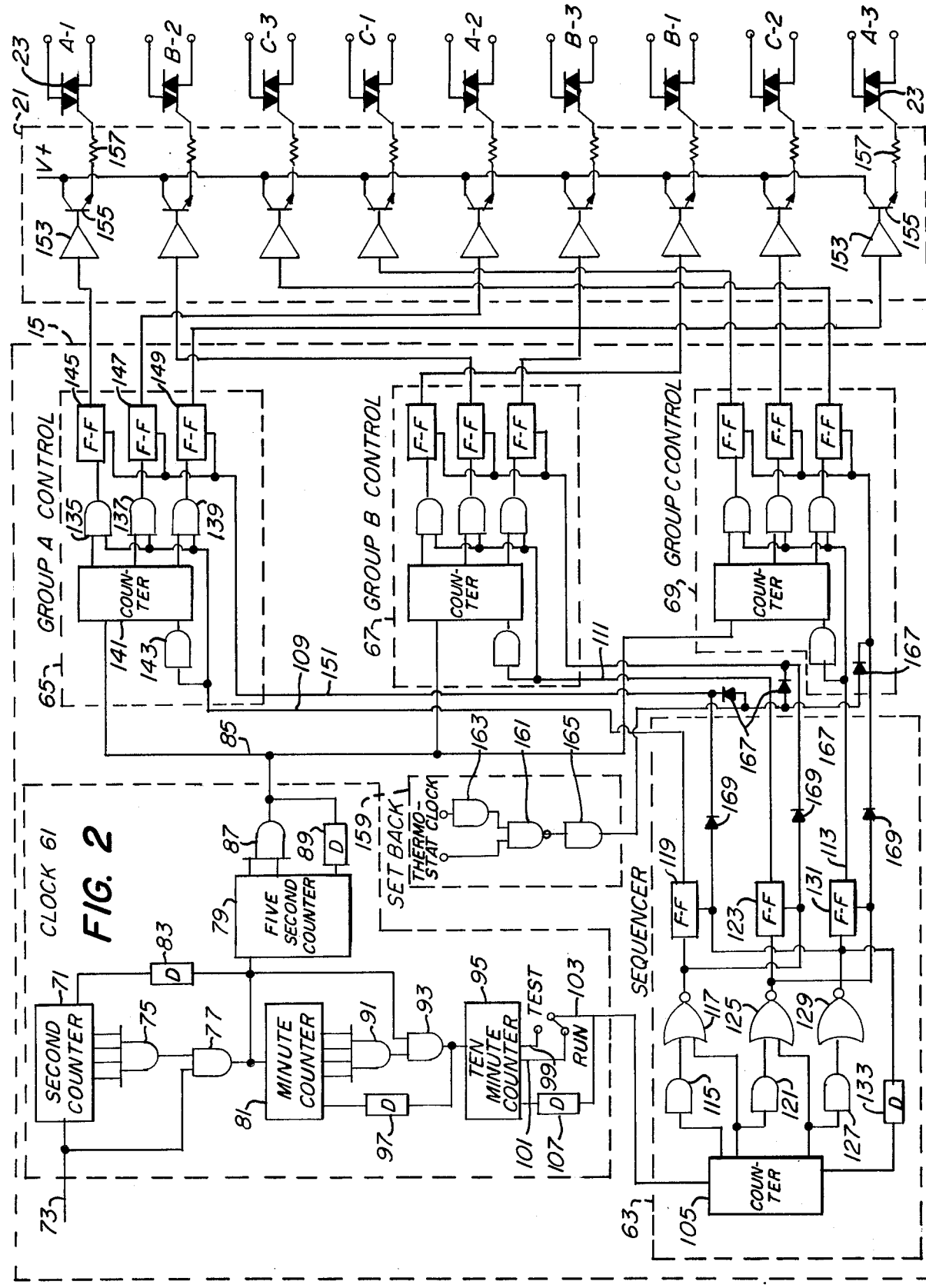
FIGS. 2 and 3 are schematic circuit diagrams of portions of the system which are shown in block diagram form in FIG. 1.

The solid state control 15 shown in FIG. 1 includes a clock 61, a sequencer 63 and Group A, B and C controls 65, 67 and 69 respectively as shown in FIG. 2. The clock 61 includes a binary counter 71 which counts the pulses in the 60 hertz pulse signal on lead 73 generated by the power supply 5. When counter 71 has accumulated a count of 60, the output of AND gate 75 goes high to gate a pulse through AND gate 77 to binary counters 79 and 81. The pulse signal is also fed back through a delay element 83 to reset the counter 71. The counter 79 generates a signal on a line 85 every 5 seconds by loading AND gate 87 and resets itself through delay element 89. The counter 81, on the other hand, counts minutes by accumulating a count of 60 and then loading AND gate 91 which gates pulses from gate 77 through AND 93 to decimal counter 95. The counter 81 is reset each minute by delay element 97. The counter 95 generates a signal every minute on lead 99 and every ten minutes on lead 101. Normally, switch 103 is positioned as shown in FIG. 2 to apply the ten minute signal to a decimal counter 105 in the sequencer 63 through lead 101. For test purposes, the switch 103 can be positioned to apply a pulse from lead 99 to counter 105 every minute. The counter 95 is reset after the selected interval through delay element 107.

The sequencer 63 generates signals on leads 109, 111 and 113 which energize the three group controls 65, 67 and 69 respectively for intervals of twenty minutes alternating with ten minute off periods on a rotating basis. With switch 103 in RUN, counter 105 is incremented by a clock pulse every ten minutes. The first count causes the output of an inverter 115 which is applied to a NOR gate 117 to go low. Since the other input to NOR 117 from the counter 105 is also low at this time, the output goes high to set flip-flop 119 and energize lead 109. On the second count of counter 105, the output of inverter 121 goes high to set flip-flop 123 through NOR gate 125 and lead 111 is energized. At this time, the output of NOR 117 goes low, however, lead 109 remains energized through flip-flop 119. On the third count of counter 105, the output of inverter 127 goes low, causing the output of NOR 129 to go high. This sets flip-flop 131 which energizes lead 113 and also resets flip-flop 119 to deenergize lead 109. Lead 111 remains energized through flip-flop 123 even though the output of NOR gate 125 goes low. The output of NOR 129 also resets counter 105 through delay circuit 133. On the next count of counter 105, flip-flop 119 is set again in the manner previously described and flip-flop 123 is reset to denergize lead 111 by the output of NOR 117. Similarly, flip-flop 131 is reset to deenergize lead 113 on the subsequent count of counter 105 while flip-flop 123 is being set again by NOR 125. Thus it can be appreciated that lead 109, 111 and 113 are energized for twenty minute intervals and denergized for ten minutes on a rotating basis such that at all times two of the leads are energized and one is deenergized.

The signal from the sequencer on lead 109 enables AND gates 135, 137 and 139 in the Group A control circuit 65. The control circuit also includes a decimal counter which is incremented at 5 second intervals by the signal on lead 85 from clock 61. The counter 141 is held in the reset state by the output of inverter 143 when there is no signal from the sequencer on lead 109. When counter 141 is released for counting by a positive signal on lead 109, the first count causes the second input of AND 135 to go high and set flip-flop 145. Five seconds later, flip-flop 147 is set by AND gate 137 and in like manner AND gate 139 sets flip-flop 149 at the end of another five second interval. The outputs of flip-flops 145, 147 and 149 are utilized to enable the conditioner units in Group A; however, it will be appreciated from the above discussion that the individual units will be enabled at five second intervals to reduce the electrical demand associated with the start up of the induction motors in the conditioner units. At the conclusion of the twenty minute enable period, the flip-flops 145, 147 and 149 are reset by the signal on lead 151 which also resets flip-flop 119 in the sequencer. The control circuits 67 and 69 for Groups B and C are identical to that just described in connection with Group A.

They operate in the same manner with Group B energized by, and reset with, the flip-flop 123 in the sequencer and with Group C controlled by flip-flop 131.

The output of each of the control circuit flip-flops is individually fed to the triac driver circuits 21. Each of these driver circuits includes an operational amplifier 153 connected to the base of a transistor 155. The op amp 153 inverts the output of the associated flip-flop so that that transistor is turned on when the flip-flop is in the reset state. The emitter of the transistor is connected through a resistor 157 to the gate electrode of triac 23. Thus, when the associated flip-flop in one of the control circuits is in reset, the triac is turned off. The triacs 23 enable or disable the controls for the individual conditioner units in the manner discussed in connection with FIG. 1.

A setback feature can be provided which turns off the conditioning units during periods when the conditioned area is unoccupied. The setback control 159 includes a NAND element 161 which is gated by a signal from thermostat control 19 (see FIG. 1) and a second signal from programmable clock 17 which is inverted by inverter 163. The output of NAND 161 is inverted by inverter 165 and applied through diodes 167 to the reset circuits of the flip-flops in the group controls 65, 67 and 69. Diodes 169 block the setback signal from the sequencer 63.

Under normal conditions, the thermostat control 19 applies a high signal to NAND 161. During off hours, the signal from the programmable clock 17 goes low to load gate 161 and cause the output of inverter 165 to go high, which maintains all the flip-flops in the Group A, B and C controls in the reset state. Therefore, during off hours, all of the triacs 23 are energized and none of the conditioner units can operate. However, should the temperature get too low in the case of heating, or too high in the case of air conditioning, the signal from the thermostat 19 will go low to cause the output of inverter 165 to go low and since the sequencer continues to operate under setback control, the system will revert to normal operation until the conditions set for thermostat control 19 are met. When the setback period is over, the signal from programmable clock 17 goes high to assure that the output of inverter 165 remains low and the system reverts to normal operation regardless of the signal from thermostat control 19. Thus with setback control, energy can be saved by turning off all of the units during off hours yet the thermostat control can override setback should conditions so dictate.

Figure 3:
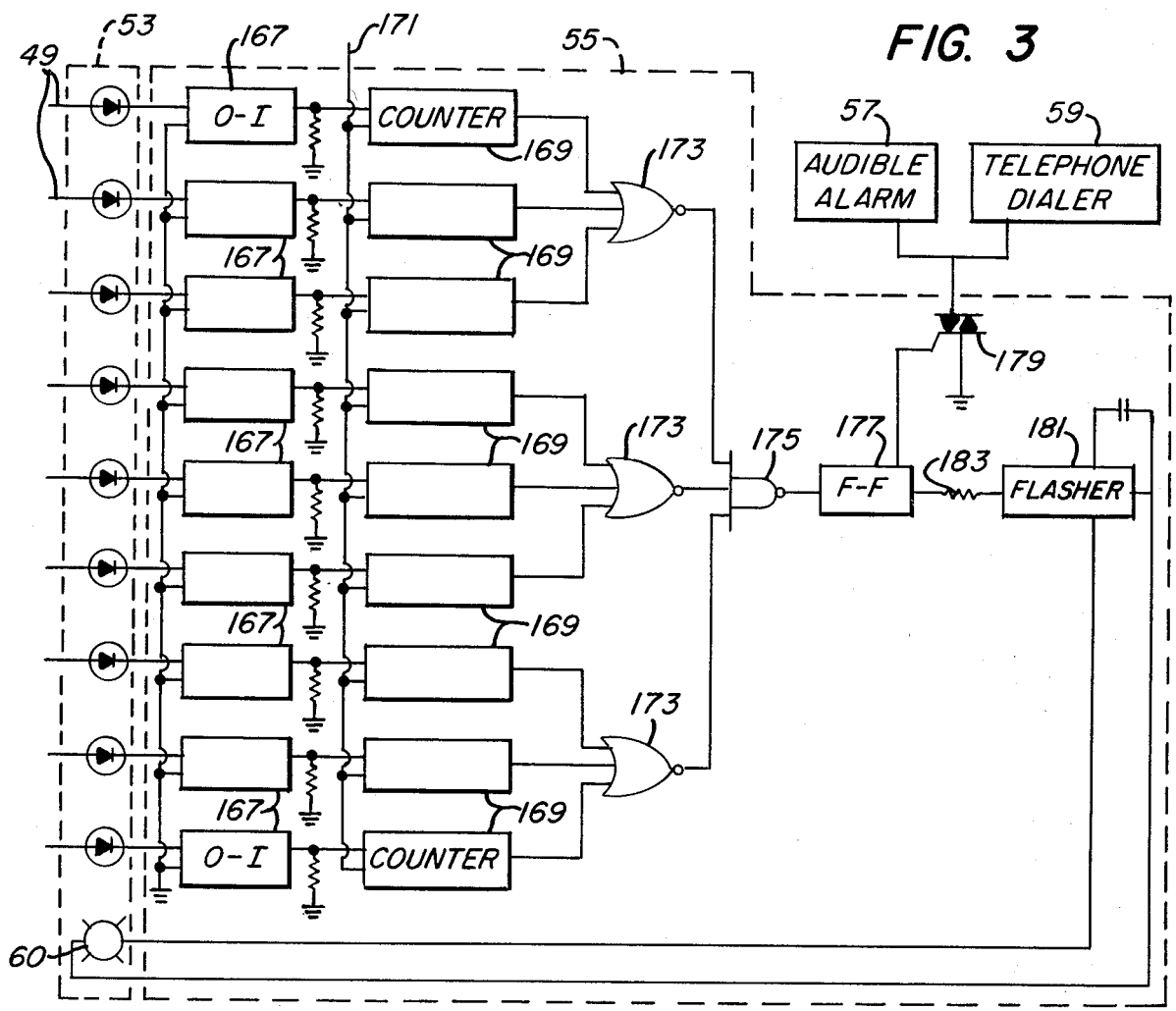

FIG. 3 illustrates the wiring of the light panel 53 and warning circuits 55 of FIG. 1. The individual LEDs 51 are energized through lead 49 when the associated conditioner unit is running, as indicated by energization of the control relay 33. Each LED 51 is also connected in series with an optoisolator 167 in the warning circuit. The output of the optoisolator is connected to the input of a counter 169 which counts the number of times that the individual units cycles on. All of the counters 169 are reset every ten minutes by the ten minute signal from clock 61 on line 171. If any of the counters reach a preset count in any ten minute time period, the output of that counter causes the output of a NOR gate 173 to go low. This in turn causes the output of a NAND 175 to go high to set a flip-flop 177. The setting of flip-flop 177 turns on a triac 179 which energizes audible alarm 57 and/or a telephone dialer 59. Flip-flop 177 also energizes an integrated circuit 181 through resistor 183. A capacitor 185 across IC 181 causes warning LED 60 in the control panel to flash until flip-flop 177 is manually reset. Thus, if any of the units cycles more than a preset number of times in a ten minute period, the audible alarm 57, telephone dialer 59 and flashing warning light 60 are activated to notify personnel of the abnormal condition. As an example, the counters 169 can be set to generate the warning signal when the compressor of an air conditioning or refrigeration unit cycles eight times within a ten minute period. In the case of heating units, four cycles during a ten minute period would be cause for an investigation.

Figure 4:
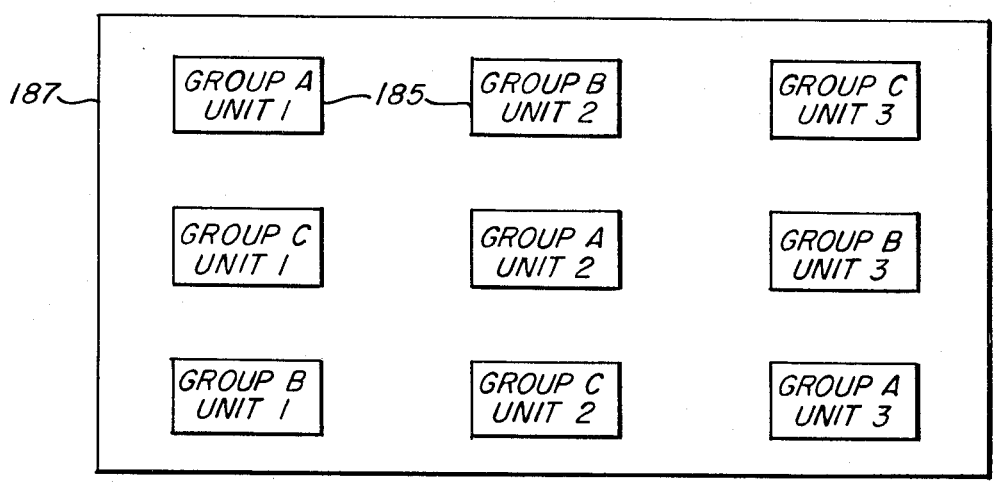
FIG. 4 is a schematic diagram illustrating a possible distribution of conditioner units in a large enclosed area in accordance with the invention.

FIG. 4 illustrates schematically an arrangement for interdispersing the nine air conditioning or heating units 185 of the illustrative system throughout an enclosed area 187 so that portions of the area serviced by units which are on the off cycle are always adjacent units which are enabled by the system. With this arrangement, the "umbrella effect" created by the over capacity of the individual units serves to maintain conditions in those areas serviced by the "off" units within acceptable limits. At the same time, the system reduces the peak demand for electrical power by permitting a maximum of only two-thirds of the units at one time and by staggering the initial start of units in each group. As applied to refrigeration units which are not ordinarily arranged to provide the "umbrella effect," the twenty minute "on" period followed by ten minutes "off" has been found to be very satisfactory in reducing the buildup of frost and ice and has eliminated or reduced by one-half the need for supplemental heating for defrosting. As a result, the refrigeration units run more efficiently and therefore at less cost.

While specific practical embodiments of the invention have been disclosed, they are intended to be illustrative only and are not to be taken to limit the invention which is to be given the full scope of the appended claims and all equivalents thereof.

We claim:

1. A system for controlling a multi-unit temperature conditioning installation comprising:
   means for repetitively generating timing intervals;
   a plurality of control means each of which is connected to enable a group of said temperature conditioning units when energized; and
   sequencer means for sequentially and repetitively, one after the other, at intervals equal to one of said timing intervals, energizing a control means for a first preset number of said timing intervals and then deenergizing it for a second preset number of said timing intervals with the total of said first and second preset number of intervals equal to the total number of control units such that a total of said first preset number of control units are energized and the second preset number are deenergized during each timing interval, whereby groups of said conditioning units are disabled for a preset period of time on a rotating basis.

2. The system of claim 1 wherein said second preset number of intervals is equal to one whereby one group of said conditioning units is disabled at all times.

3. The system of claim 2 wherein said first preset number of intervals is equal to two whereby two-thirds of said conditioning units are enabled at all times and one-third are disabled.

4. The system of claim 1 wherein each control means includes time delay means for enabling the associated conditioning units one at a time at spaced second intervals of time following energization of said control means, whereby the associated conditioning units can only be turned on one at a time following selection of the associated group by the sequencer to reduce the instantaneous total load demand produced by start up of the individual units.

5. The system of claim 1 wherein each said temperature conditioning unit incorporates controls which turn the unit off and on in response to predetermined conditions and including alarm means which counts the number of times that each unit turns on within a preset time period and generates an alarm signal when a unit is turned on more than a preset number of times within said preset time period.

6. The system of claim 5 wherein said preset time period is one of said timing intervals.

7. The system of claim 1 wherein conditioning units from the several groups are interdispersed throughout a large enclosed area whereby a unit which is disabled by its associated control means will always be adjacent a unit which is enabled and therefore the entire enclosed area will be conditioned continuously.

8. The system of claim 7 including setback means to disable all said control means during selected hours of the day.

9. The system of claim 9 including thermostat means for overriding said setback means when the temperature in said enclosed area deviates from a preset temperature range.

10. A method of operating a plurality of temperature conditioning units comprising the steps of:
    dividing the conditioning units into groups;
    generating timing intervals;
    sequentially and repetitively one after the other at intervals equal to one timing interval, enabling a group of units for a first preset number of said intervals and then disabling them for a second preset number of intervals with the sum of said first and second intervals equaling the number of groups.

* * * * *